United States Patent [19]

Llop et al.

[11] 4,195,412
[45] Apr. 1, 1980

[54] INSTALLATION FOR CONTROLLING THE POSITION OF A MOVABLE PART

[75] Inventors: Helenio Llop, Montreuil-sous-Bois; Claude A. Letort, Boulogne-sur-Seine, both of France

[73] Assignee: Societe d'Optique, Precision Electronique et Mecanique Sopelem, Paris, France

[21] Appl. No.: 922,808

[22] Filed: Jul. 7, 1978

[30] Foreign Application Priority Data

Jul. 8, 1977 [FR] France ................................. 7721099

[51] Int. Cl.² .............................................. G01B 5/20
[52] U.S. Cl. ..................................... 33/169 R; 356/141
[58] Field of Search ............ 33/169 R, 174 R, 174 P, 33/286, 1 M, 179.5 R; 356/141, 142, 147, 150, 152, 153

[56] References Cited

U.S. PATENT DOCUMENTS

| | | | |
|---|---|---|---|
| 3,600,987 | 8/1971 | Kvasnicka | 33/286 |
| 3,722,842 | 3/1973 | Schweizer | 33/169 R |
| 3,736,818 | 6/1973 | Ennis | 33/286 |
| 3,741,659 | 6/1973 | Jones, Jr. | 33/179.5 R |

*Primary Examiner*—Willis Little
*Attorney, Agent, or Firm*—Haseltine, Lake & Waters

[57] ABSTRACT

Apparatus for controlling the position of a part, e.g. a feeler or work tool, along two orthogonal directions, the part being slideable in a first slide extending in one direction and mounted on a carriage movable along a second slide extending in the other direction and mounted on a support. The apparatus comprises a device for locating the position of the carriage on the second slide and the movable part on the first slide, a device for measuring the error in straightness of said second slide and a device for measuring the error in orthogonality of the first slide, each device comprising a laser generator for producing a laser beam parallel to the respective direction and a photoelectric detector in the path of the respective beam and subject to the respective error to be measured.

8 Claims, 5 Drawing Figures

4,195,412

INSTALLATION FOR CONTROLLING THE POSITION OF A MOVABLE PART

FIELD OF THE INVENTION

The invention relates to an installation for controlling the position of a movable part.

PRIOR ART

It is frequently required to control the position of a movable part, whether this be, for example, a tool of a machine-tool or a feeler for checking the dimensions of an object. These movable parts are movable along two orthogonal slides, one of which is mounted on a chassis or support and the other of which is mounted on a carriage which is movable along the slide on the support. In machine-tools or in devices for checking objects of large dimensions, it has hitherto been necessary to use a very rigid support which was very stable with time and carried perfectly rectilinear slides; this was very expensive.

Devices are known for measuring the errors in the straightness of a slide. Such a device comprises means for emitting a narrow laser beam parallel to the slide and defining an optical reference axis, and means for measuring transverse deviations, which means generally comprises a photoelectric detector on which the laser beam impinges and which produces a signal representing the deviation, relative to a reference position, of the position of the point of impact of the beam on the detector.

SUMMARY OF THE INVENTION

According to the invention there is provided apparatus for controlling the position of a part movable along at least two directions xx' and yy', said movable part being movable along a first slide extending parallel to said direction yy', said first slide being mounted on a carriage movable along a second slide extending parallel to said direction xx', said second slide being mounted on a support, said apparatus comprising:

means for locating the position y of said movable part along said first slide;

means for locating the position x of said carriage along said second slide;

a device for measuring the error in the straightness of said second slide comprising:

means for emitting a first narrow laser beam parallel to said direction xx' and defining a first reference axis, and a first photoelectric detector in the path of the beam for producing a signal representing the transverse deviation $\Delta y$ of said carriage relative to said first reference axis;

and a device for measuring the error in the orthogonality of said first slide comprising an optical square is mounted on said carriage for deflecting said first laser beam to form a second laser beam which is perpendicular to said first beam and defines a second reference axis parallel to the direction, and a second photoelectric detector for measuring the transverse deviation $\Delta x$ of said movable part relative to said second reference axis.

The invention will be more fully understood from the following description of embodiments thereof, given by way of example only, with reference to the accompanying drawings.

DETAILED DESCRIPTION

Figure 1:
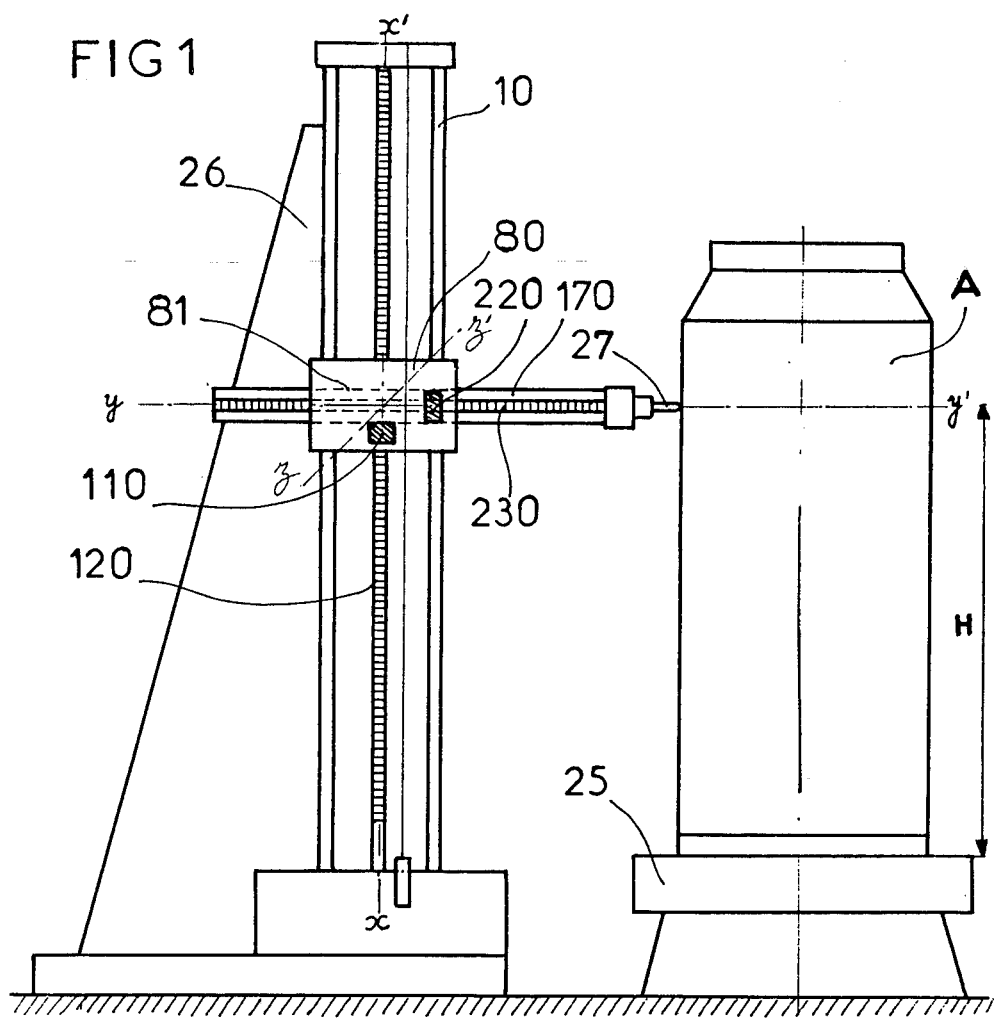
FIGS. 1 and 2 show a side-view and a top-view respectively of an embodiment of apparatus for controlling the position of a movable part according to the invention, the movable part being for example a feeler for use in checking the dimensions of an object.
Figure 2:
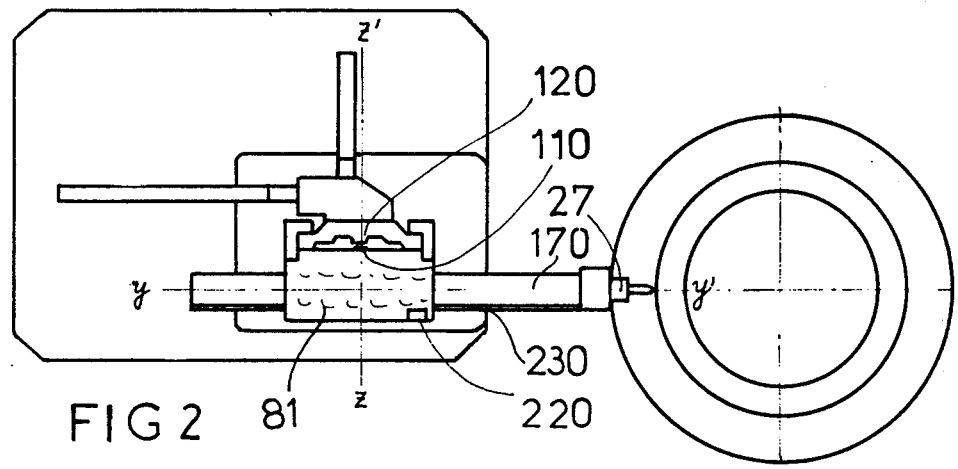

As seen in FIGS. 1 and 2, an object A whose dimensions are to be checked, and which can be of cylindrical shape and large dimensions, is placed on a rotatable plate 25 near a vertical support 26 to which a slide 10 is attached. A carriage 80 is slidable along the slide 10. A slide 81, perpendicular to the slide 10, is attached to carriage 80, and an arm 170 is slidable along slide 81, the arm 170 carrying a feeler 27 at its end. Conventional means (not shown) are provided for moving the arm 170 relative to the carriage 80 and for moving the carriage 80 along the slide 10.

Two measuring scales 120, 230 are arranged, scale 120 along the slide 10 and scale 230 along the arm 170. Optical reading devices 110 and 220 are placed on the carriage 80 opposite the scales 120 and 230 respectively.

Apparatus as described above makes it possible to locate each point on the object A relative to a system of axes xx', yy' which are defined by the two slides 10 and 81, the dimensions x and y being respectively measured on the scales 120 and 230 by means of the reading devices 110 and 220. Furthermore, a circular optical coder is provided to make it possible to measure the angle of rotation of the plate 25 relative to a reference orientation, so as to perfectly locate each meridian. Since the body is most frequently cylindrical, it is also possible, having fixed the arm 170 at a given height x, to rotate the body on the plate, the measurement being carried out continuously by means of the feeler 27.

However, apparatus as described above, which is of a well-known type, can only give precise results if the slides are perfectly rectilinear and the apparatus is absolutely rigid. In the case of objects of very large dimensions, this result can only be obtained with great difficulty and under very expensive conditions.

Figure 3:
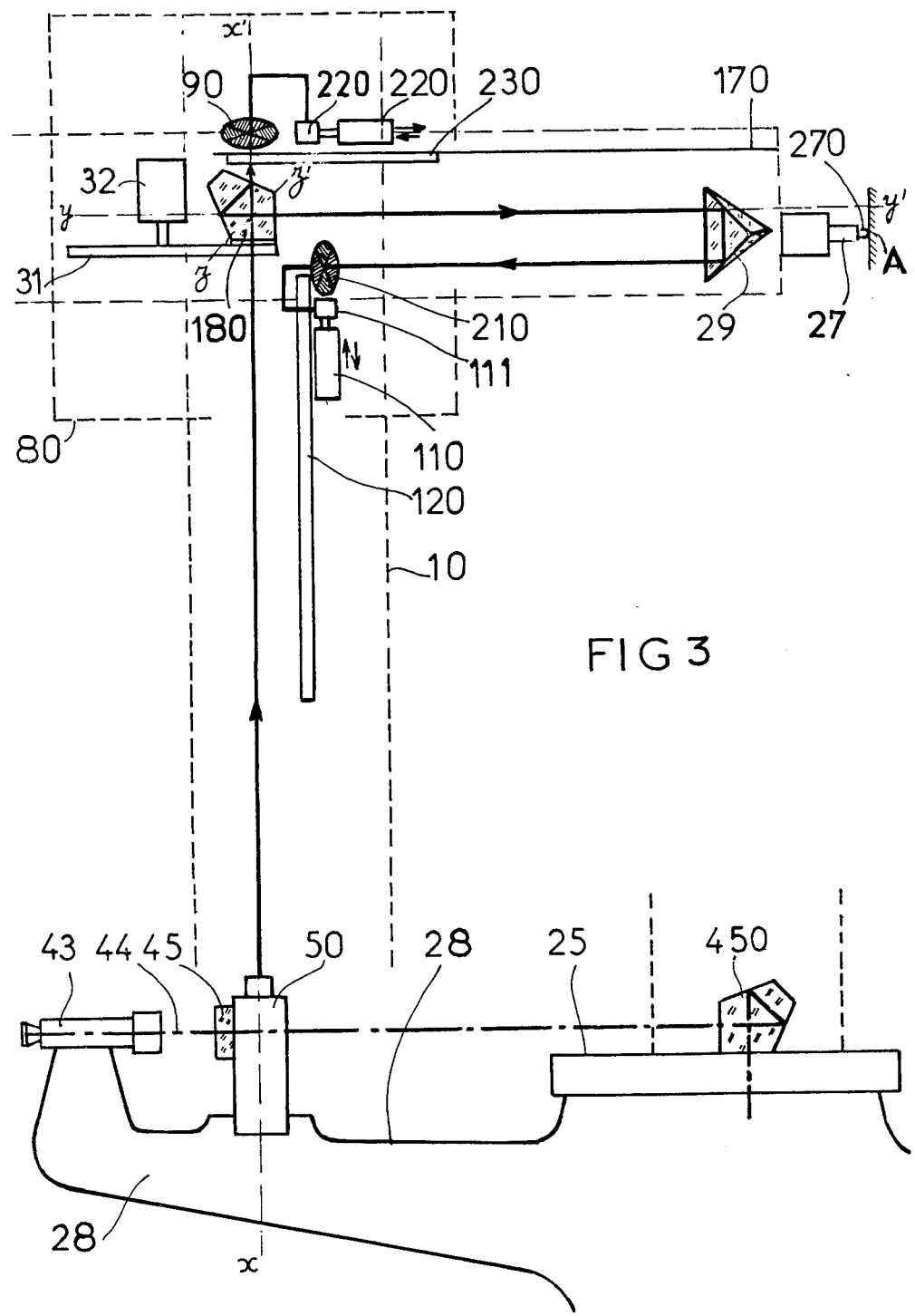
FIG. 3 is a functional diagram of the control apparatus of FIGS. 1 and 2.

To avoid this requirement and enable checking of an object A with high precision, even if the rigidity and the straightness of the apparatus are not perfect, the apparatus includes devices shown in FIG. 3.

In FIG. 3, which is a functional diagram of the apparatus, the slide 10, the carriage 80 and the arm 170 have only been shown by broken lines. A single-mode laser emitter 50, emitting a narrow beam along the axis x'x parallel to the slide 10, is fixed on a plinth 28 at the foot of the support 26.

A photoelectric cell 90 is mounted on the carriage 80 in the path of this laser beam to provide a measure of the transverse error $\Delta y$, due to straightness defects in the slide 10 or to bending of the support 26, and to provide a correction for the dimension read off by means of the reading device 220.

An optical member 180, mounted on the carriage 80 in the path of the beam from laser emitter 50, forms a second beam along axis yy', which second beam is perpendicular to the first beam along axis xx'. Hence, optical member 180 is a so-called optical square.

A photoelectric cell 210 may be placed at the end of the arm 170, as close as possible to the feeler, in the path of this second beam to provide a measure of the transverse error $\Delta x$ in the position of the feeler 27, which error is due to a straightness defect in the slide 81, or to bending of the arm 170 in the plane including the axes xx' and yy'.

With knowledge of the error $\Delta x$, it is possible to correct the dimension x read off by the reading device 110.

Furthermore, the cell 210 also makes it possible to measure, relative to an axis zz' perpendicular to the plane including the axes xx' and yy', the error $\Delta z$ in the feeler 27, which is due to the bending of the arm 170 in the plane including the axes yy' and zz'. With knowledge of this error, it is possible to correct the position of the arm in the plane including the axes yy' and zz' and thus to adjust the feeler 27 in order to reposition it on its meridian.

The cell 210 is preferably, as shown, placed on the carriage 80, the laser beam being deflected through 180° by means of an optical device 29 which is placed near the feeler 27 and sends the beam back parallel to itself.

In this case, the cell 210 measures twice the transverse error $\Delta x$ or $\Delta z$.

As shown FIG. 3, the optical device 29 is a trihedron. If it were desired to restrict measurement only to the deviation $\Delta x$ or the deviation $\Delta z$, the trihedron could be replaced by a dihedron which would then be sufficient.

The apparatus may be associated with a calculator giving the dimensions x, y and z as a function of coded signals received by the reading devices 110 and 220. It is then easy to convert the information provided by the cells 210 and 90 into signals which represent the measurement errors and are compatible with the signals emitted by the reading devices 110 and 220, so that the calculator performs the algebraic summations of the measured dimensions and the errors in order to obtain the actual dimensions relative to the reference axes.

In the case of FIG. 3, the errors $\Delta x$ and $\Delta z$ are initially divided by 2 in order to take account of the doubling of the displacement because of the optical device 29.

As regards the dimensions x and y, it is possible to automatically correct the error by acting directly on the reading devices 110 and 220. In such a case, as shown, each reading device is mounted on a slide-block which is movable parallel to the corresponding scale 120 or 230 by means of a drive unit 111 and 221 respectively. The error signal emitted by the corresponding cell, for example cell 90, is used by a conventional servo-control means which acts on the drive unit 221 to move the reading device 220 in the opposite direction to the error measured. In this case, the dimension is measured exactly by means of the reading device 52 relative to the reference axis x'x, consequently avoiding the algebraic addition of the measured deviations.

The cell 90 could be integral with the reading device 220 and be automatically re-centered on the laser beam to cancel out the error.

Correspondingly, the error signal emitted by cell 210 could be used to act on the drive unit 111 to move the reading device 110 by the desired amount, in magnitude and in sign, in order to cancel out the error, that is to say in the case of FIG. 3, by half the error. The dimension is thus measured relative to the axis yy'.

It is desired to avoid providing the optical square 180 with a semi-reflecting face to allow part of the laser beam to pass through towards the cell 90, with a consequent loss of light, the optical square 180 may be mounted on a disc 31, as shown in FIG. 3, which is mounted on the carriage 80 for rotation about a vertical axis and is rotated by means of a synchronous motor 32. A cover, associated with the disc 31, makes it possible to measure x and y alternately, the beam being sent alternately towards the cell 90 and towards the cell 210. This has the additional advantage that it modulates the laser beam and therefore improves the signal-to-noise ratio on the cells.

Figure 4:
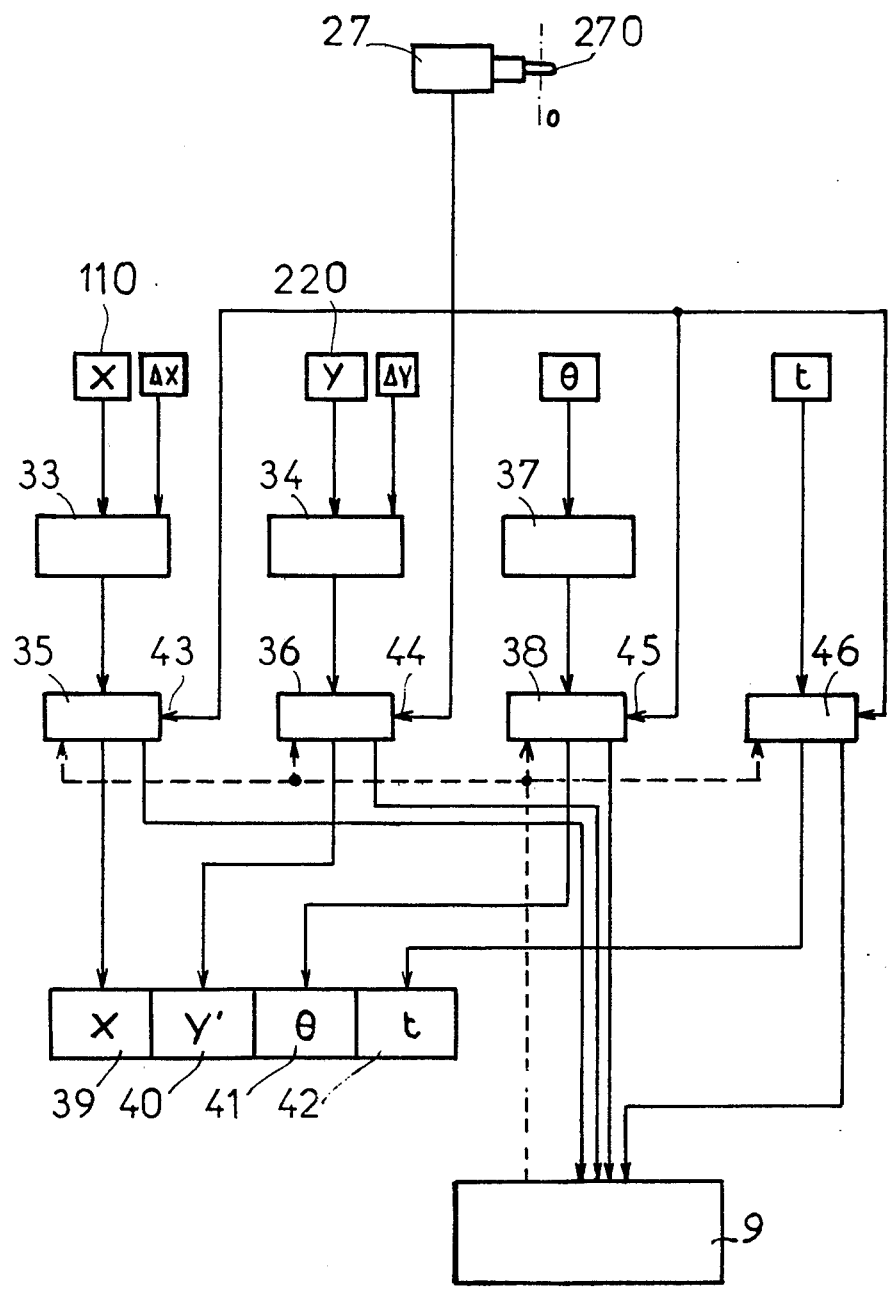
FIG. 4 is a functional diagram of a calculating and display device of the apparatus of FIG. 3.

The measurements are used in a system, the block diagram of which is given in FIG. 4. The information emitted by the reading devices 110 and 220 is sent to counters which allow for the errors $\Delta x$, $\Delta y$ and $\Delta z$ measured by the cells 210 and 90. To simplify the diagram, only counters 33 and 34, which relate to x and y, have been shown. These counters 33 and 34 determine the exact dimensions, x' and y', which are recorded in memories 35 and 36. The angular position of the plate 25 is measured by a circular coder which is not shown. Via a decoding system 37, this coder gives the measurement which is recorded by a memory 38.

The dimensions and the measured angle recorded by the memories can be displayed in the same way, if desired, as can the temperature t provided by a temperature sensor and recorded by a memory 46, on dials 39, 40, 41 and 42.

A system for blocking the memories is provided enabling the dimensions indicated by the counters to be recorded only at the desired time. This blocking system is controlled by the passage through zero of the feeler 27. The feeler 27 carries, in a conventional manner, a rod 270 which is pushed outward by a spring. When the rod is out, it provides a voltage, for example $-v$. When the rod is pushed inwardly, the voltage decreases, passes through zero and becomes positive. The passage through zero corresponds to a precise position of the feeler relative to the object. It is at this moment that the feeler generates an impulse for blocking the memories, which is sent into imputs 43, 44 and 45 of the memories so that only the information read at this instant by the measuring instruments is recorded in the memories. As a result, the dimensions recorded always correspond to the same position of the feeler, which facilitates the handling of the arm by the operator and enables the operation to be automated, if desired.

A diameter can therefore be measured in the following manner:

The carriage 80 is brought to the dimension x of the diameter in question. The arm 170 moves forward until the rod 270 of the feeler 27 touches the object A and is retracted into the feeler 27. The dimension y changes as the arm moves forward. The feeler emits an impulse when the rod has retracted by a constant amount, for example by 5 mm. The impulse therefore corresponds to a position of the feeler relative to the object which is known to within a few microns.

At the instant that the feeler emits its impulse, the corrected dimension y' is transferred to the memory, at the same time as the corrected dimension x' and the angle $\theta$. The arm continues its motion and gradually stops, obviously before total retraction of the rod of the feeler. This stopping can either be brought about automatically by means of the impulse produced by the feeler or it can be brought about by the operator who has been warned by a signal that the impulse has been emitted and that the dimension has been recorded.

Thus, measurement is carried out without abruptly stopping the arm, which avoids any impact and vibration. The calculator 9 then receives the information contained in the memories 35, 36 and 38, in the same way, if desired, as that contained in a memory 46 where, for example, the temperature has been recorded, and it carries out any desired corrections to the measurements. In fact, the temperature deviations and variations, which have the effect of expanding and deforming the entire structure used for measurement, can be assimilated together, moreover, with other sources of error such as the air turbulence acting on the optical beams and the vibrations of the support. The calculator can be programmed so as to apply the desired corrections as a function of these various parameters. Thus, it can have, in its memory, the calibration curves of the measuring scales in order to carry out the corrections as a function of the position of the carriage and as a function of the expansions.

In the case where the transverse errors measured are represented not by a displacement of the corresponding reading devices, for automatic correction of the error, but by analog signals produced directly by the cells, the calculator may have, in its memory, the calibration curve for each cell so as to calculate the transverse error correction to be applied to the measurement of the dimension, the cell supplying information which is proportional to the displacement of the beam.

Other means of measurement can obviously be used. For example, each cell can be replaced by a graduated or coded ruler supplying digital information which is converted by the calculator into a deviation which is measured on the same scale as the dimension x or y and is added algebraically to the latter.

Furthermore, the apparatus described above can be provided with a certain number of useful improvements.

The first improvement, shown in FIG. 3, makes it possible to check the perpendicularity of the reference axis xx' to the plate 25. The plate 25 and the support 26 are mounted on the fixed plinth 28. On this plinth are fixed, the laser emitter 5 and a self-collimating telescope 43 whereby it is possible to sight simultaneously, along an axis 44, a mirror 45 fixed to the laser emitter 5 parallel to the axis x'x and one face of an optical square 450 forming an invariant with two perpendicular faces, the other perpendicular face being placed on the plate 25. It is thus possible to check that the mirror 45 and thus the axis xx' are perpendicular to the plate 25. When the axis xx' has been adjusted in this way, it is also possible to measure the errors in the perpendicularity of the plate 25 during rotation of the plate.

By means of an analogous method, it is possible to measure the errors due to the mounting of the object A to be checked on the plate 25.

By virtue of arrangements of this kind, it is therefore possible to separate, within the measured deviations, errors of construction which it is desired to check from errors due to mounting of the object on the plate and to rotation of the plate.

Figure 5:
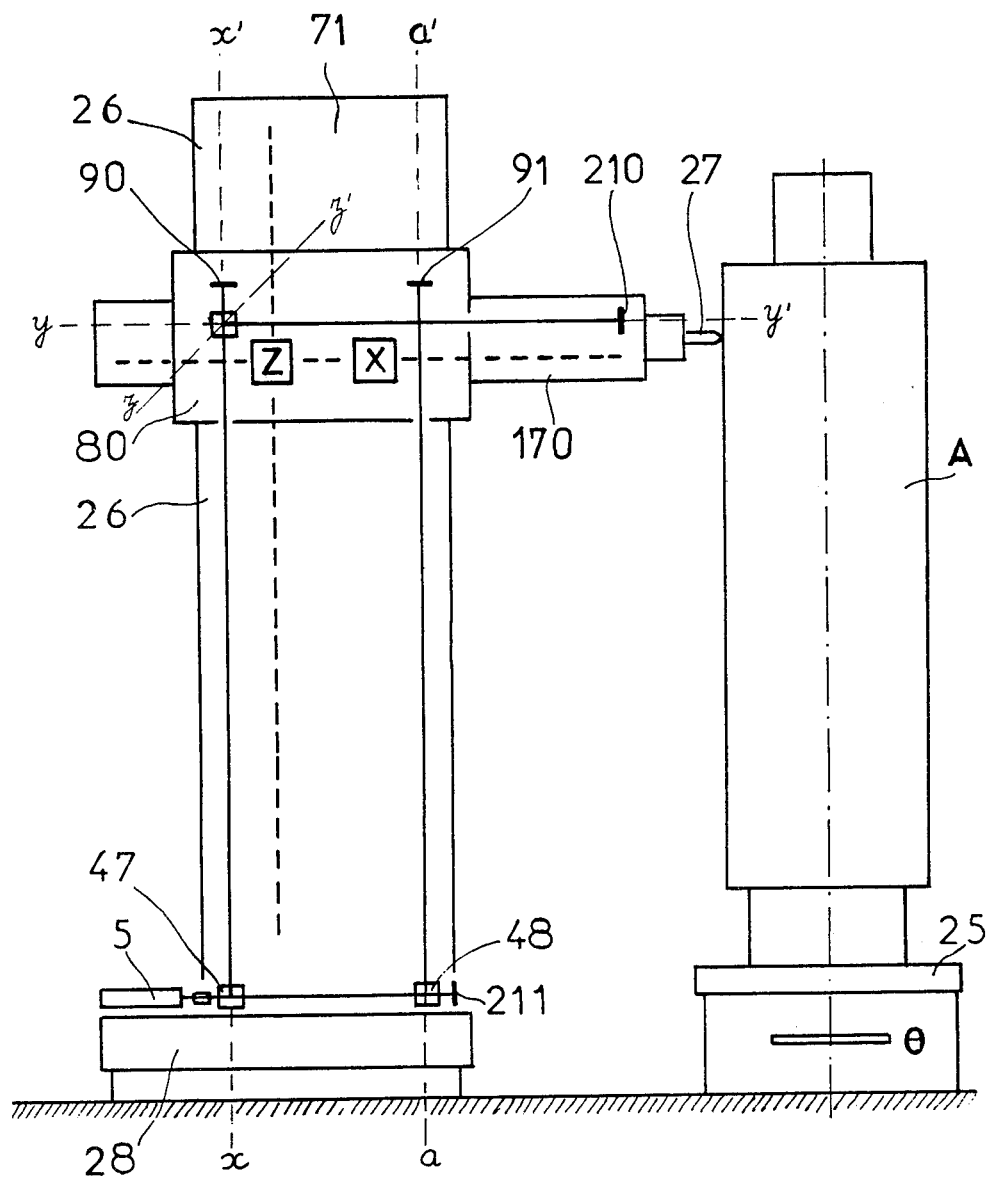
FIG. 5 is a diagram of a modification of the control apparatus of FIG. 3.

A further improvement, represented schematically in FIG. 5, makes it possible to measure the additional error which can arise due to twisting of the support 26 and which should be taken into account because it is multiplied by the length of the arm.

In this improved embodiment, the apparatus comprises the elements which have been described above. However, the laser emitter 5 is fixed on the plinth 28 parallel to the plate 25, the reference axis xx' being obtained by deflecting the laser beam by means of an optical square 47 having a semi-transparent inclined face. A cell 211 enables checking of the horizontality of the beam emitted by the laser 5.

The direct method of measurement of the transverse errors $\Delta x$ and $\Delta z$, by means of a photoelectric detector 210 placed at the end of the arm 170 on the reference axis yy', has been shown by way of example.

In this embodiment, the laser emitter 5 produces not only the first laser beam on axis xx', but also a second vertical laser beam along an axis aa', parallel to axis xx', by means of optical squares 47 and 48 mounted on the plinth 28, the two beams being spaced apart by a distance equal to the width of the carriage 80, which is of the order of one metre.

A cell 91 is arranged in the path of the beam on axis aa', and the two cells 90 and 91 each produce two electrical signals as a function of the displacement of the centre of the intercepted light spot, respectively along the direction yy' and along the direction zz' perpendicular to the plane of measurement including the axes xx' and yy'. As indicated above, the calculator calculates the correction $\Delta y$ to be applied to the measurement of the dimension y, allowing for the calibration curve of the cell 90, but it can also calculate the deviation in the position of the feeler 27 in the direction zz' as a function of the length of the arm 170 and as a function of the twist of the support 71.

The angle of this twist is equal to the difference between the deviations $\Delta z_1$ and $\Delta z_2$ measured by the cells 90 and 91, this difference being divided by the distance separating these cells.

The invention is not intended to be limited to the details of the embodiments which have now been described above, but includes numerous variants using equivalent means or applying the devices described above to other uses.

Thus, the movable part, which is a feeler for checking dimensions in the embodiments which have been described, could alternatively be, for example, a tool for machining or cutting. In fact the principle of the invention, which consists in using one or more laser beams as reference axes on machine-beds or chassis having a length of the order of about 10 metres, could be applied to numerous types of machines of large dimensions, whereas measurements made using laser beams have hitherto only been used for much greater distances and for less stringent purposes, for example for guiding missiles or in topographical measurements.

There is thus provided, apparatus for controlling the position of a movable part, which is as precise as or even more precise than those which comprise, as hitherto, a very rigid support which is very stable with time and carries perfectly rectilinear slides, but using much more economical means.

What is claimed is:

1. Apparatus for controlling the position of a part movable along at least two directions xx' and yy', said movable part being movable along a first slide extending parallel to said direction yy', said first slide being mounted on an arm carried by a carriage movable along a second slide extending parallel to said direction xx', said second slide being mounted on a chassis, said apparatus comprising:

means for locating the position y of said movable part along said first slide;

means for locating the position x of said carriage along said second slide;

a device for measuring the error in the straightness of said second slide comprising;

means for emitting a first narrow laser beam parallel to said direction xx' and defining a first reference axis, and a first photoelectric detector in the path of the beam for producing a signal representing the transverse deviation $\Delta y$ of said carriage relative to said first reference axis; and a device for measuring the error in the orthogonality of said first slide comprising an optical means mounted on said carriage for deflecting said first laser beam to form a second laser beam which is perpendicular to said first beam and defines a second reference axis parallel to the direction, and a second photoelectric detector for measuring the transverse deviation $\Delta x$ of said movable part relative to said second reference axis;

means for producing a third laser beam which is precisely parallel to said first beam and a third photoelectric detector for measuring the transverse deviation of said third beam in the direction y-y', said three photoelectric detectors also measuring the transverse deviation $\Delta z$ of the three respective laser beams in a direction zz' forming a tri-rectangular trihedron with the direction xx' and yy'.

2. Apparatus according to claim 1 wherein said second photoelectric detector is mounted on said carriage, said apparatus further comprising a second optical means mounted adjacent said movable part for deflecting said second laser beam through 180° and sending said beam back parallel to itself.

3. Apparatus according to claim 2 wherein said second optical means is a trihedron.

4. Apparatus according to claim 1 wherein said optical means is an optical square.

5. Apparatus according to claim 4 comprising a plate mounted for rotation about an axis parallel to the direction xx', means mounting said optical square on said plate, the transverse deviation $\Delta x$ and $\Delta z$ measured by the second photoelectric detector being measured periodically each time said optical square passes into said first laser beam.

6. Apparatus according to claim 1 comprising means for converting the signal emitted by said three photoelectric detectors of the respective deviations respectively $\Delta x$, $\Delta y$ and $\Delta z$ into numerical information which is compatible with the corresponding dimension and means for performing the algebraic summation of the dimension and the corresponding deviation.

7. Apparatus according to claim 1 wherein said movable pad comprises a feeler comprising a support mounted on said chassis, a rod mounted on said support to slide to either side of a zero position and biased outwardly by a spring, memory means for recording the measured dimensions, said memory means being adapted to record the dimensions on reception of a control signal emitted on passage of said rod of said feeler through zero.

8. Apparatus according to claim 1 comprising means for calculating the correction to be applied to the position of said movable part in the direction yy' and in the direction zz', said correction to be applied in the direction zz' being calculated as a function of the length of said arm and of the angle of twist of said chassis, said angle of twist being equal to the difference between said transverse deviations of said first beam and said third beam, measured by said first and third photoelectric detectors, said difference being divided by the distance separating said first and third photoelectric detectors.

* * * * *